United States Patent
Hoech

(10) Patent No.: US 6,204,806 B1
(45) Date of Patent: Mar. 20, 2001

(54) METHOD OF ENHANCING RECEIVER AUTONOMOUS GPS NAVIGATION INTEGRITY MONITORING AND GPS RECEIVER IMPLEMENTING THE SAME

(75) Inventor: Robert W. Hoech, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/258,490

(22) Filed: Feb. 26, 1999

(51) Int. Cl.$^7$ ............................. H04B 7/185; G01S 5/02
(52) U.S. Cl. ............................. 342/357.02; 342/357.06; 701/214
(58) Field of Search .................. 342/357.02, 357.06; 701/214

(56) References Cited

U.S. PATENT DOCUMENTS 5,590,044 * 12/1996 Buckreub .
5,600,329 * 2/1997 Brenner .

OTHER PUBLICATIONS

Dr. Ryan S.Y. Young, Dr. Gary A. McGraw and Brian T. Driscoll, "Investigation and Comparison of Horizontal Protection Level and Horizontal Uncertainty Level in FDE Algorithms," Proceedings of the Ninth International Technical Meeting of the Satellite Division of the Institute of Navigation (ION GPS–96), Sep. 20, 1996.

* cited by examiner

*Primary Examiner*—Theodore M. Blum
(74) *Attorney, Agent, or Firm*—Nathan O. Jensen; Kyle Eppele; J. P. O'Shaughnessy

(57) ABSTRACT

A global positioning system (GPS) receiver or navigation apparatus for use on an aircraft is disclosed. The receiver implements improved methods of performing both navigation and fault detection and exclusion (FDE) functions. The GPS receiver includes an antenna adapted to receive GPS satellite signals from each of a multiple GPS satellites. Navigation solution determining circuitry coupled to the antenna receives the GPS satellite signals and performs navigation and FDE functions. The navigation solution determining circuitry is adapted to determine both a horizontal position of a least squares navigation solution for the receiver and a horizontal position of a first navigation solution for the receiver as functions of the received GPS satellite signals. The horizontal position of the first navigation solution for the receiver is offset from the horizontal position of the least squares navigation solution for the receiver. The first navigation solution can be either of a maximal accuracy or a maximal integrity navigation solution.

8 Claims, 10 Drawing Sheets

METHOD OF ENHANCING RECEIVER AUTONOMOUS GPS NAVIGATION INTEGRITY MONITORING AND GPS RECEIVER IMPLEMENTING THE SAME

FIELD OF THE INVENTION

The U.S. Government has a paid-up license in this invention and the right in limited circumstances to require the patent owner to license others on reasonable terms as provided for by the terms of the contract number F04606-959D-0071 awarded by the United States Air Force.

The present invention relates generally to global positioning system (GPS) receivers and navigation systems. More particularly, the present invention relates to methods of enhancing navigation solution integrity monitoring.

BACKGROUND OF THE INVENTION

GPS receivers and navigation systems used in aircraft utilize GPS satellite signals and information to calculate a navigation solution. A navigation solution represents the calculated position of the aircraft in three dimensional space. A navigation solution can also include heading and speed information.

Navigation solution integrity is the guarantee, to some specified high confidence level, that some scalar measure of navigation solution position error (e.g., horizontal, vertical, crosstrack, etc.) is below a threshold called the "protection level". The function or device which ensures navigation solution integrity both computes this protection level and continuously monitors a variable which is indicative of navigation solution integrity. The specified certainty to which the integrity monitor ensures navigation solution integrity is called the Probability of Detection. Also associated with the integrity monitor is a False Alarm Rate.

Receiver Autonomous Integrity Monitoring (RAIM) is one method of monitoring the integrity of a GPS navigation solution for position and time. The objective of RAIM is to protect the navigation solution against the effect of an unbounded pathological bias in any one measurement (i.e., from a GPS satellite signal) used as an input to the navigation solution. RAIM accomplishes this by monitoring the consistency of redundant position measurement data in an over-determined navigation position solution.

RAIM offers two levels of integrity capability. These differ in terms of action each undertakes following detection of a pathological measurement error bias. The first of these integrity capabilities, called RAIM Fault Detection (FD), merely alerts the user that GPS navigation is no longer operating with integrity. The second of these integrity levels, called RAIM Fault Detection and Exclusion (FDE), attempts to continue GPS navigation with integrity following a detection. FDE attempts to identify the faulted measurement and to exclude it from use in the navigation solution. If the faulted measurement cannot be identified with a certainty equal to the specified Probability of Detection, then the user is alerted that GPS navigation is no longer operating with integrity.

The performance requirements for RAIM FD in civilian aviation are specified in RTCA DO-208 and in FAA TSO C129 and C129a. The performance requirements for RAIM FDE in civilian aviation are specified in RTCA DO-229. These documents are herein incorporated by reference. The basics of RAIM have been extensively described in the literature. Conceptually, generic RAIM embraces the following principles:

(1) Each of the redundant measurements contains an error bias which, after application of all deterministic corrections, is independent of the bias in any other measurement and which can be pessimistically modeled as a zero-mean Gaussian random variable with known variance.

(2) One measurement may also contain an unbounded pathological bias. The probability of occurrence of this pathological bias in any measurement is independent of that in any other measurement and is sufficiently small such that the probability of simultaneous existence of pathological biases in two or more measurements is negligible.

(3) It is possible to posit m+1 hypotheses $H_j$, j=0 to m, where $H_0$ is the so-called null hypothesis that no pathological bias exists, Hj is the hypothesis that a non-zero pathological bias exists on measurement j, and m is the number of measurements. Exactly one of these hypotheses is true at any time.

(4) The FDE test statistic, or variable monitored by RAIM as an indicator of navigation solution integrity, is related to the bias which remains in the measurement residual vector when it is referenced to the Least Squares navigation solution. The Least Squares navigation solution is that which minimizes this bias. The measurement residual vector referenced to the Least Squares navigation solution is referred to as the Least Squares measurement residual vector.

(5) From the Least Squares measurement residual vector it is possible to compute the relative probability of each of the hypotheses $H_j$, j=0 to m, conditioned upon the value of the measurement residual vector.

(6) Based upon the characteristics of the nominal measurement error vector and a pathological bias on measurement j, it is possible to derive a probability distribution for the navigation solution error state vector conditioned upon each of the hypotheses Hj, j=0 to m.

(7) It is possible to define m−4 states, additional to the four navigation solution error states of receiver position and receiver clock bias, such that the value of all m states is uniquely related to the set of bias errors in the m measurements. These m−4 additional states, called parity states, define an (m−4) dimensional vector space called parity space. The concepts of parity space and parity states are understood in the literature.

It is possible to select a boundary in parity space such that the magnitude of the parity vector exceeds this bound with a very small probability known as the Probability of False Alarm (PFA). This limit is called the RAIM detection threshold. Note that if the parity vector magnitude exactly equals the detection threshold, then the probability of the null hypothesis approximates PFA.

(8) From the navigation solution error probability distribution described in item (6), from the formulae for the probability of hypotheses Hj described in item (5), and from analysis the sensitivity of the integrity metric and the navigation solution to a pathological bias in a particular measurement j, it is possible to establish an upper bound upon the navigation error at the point of RAIM detection with some high level of confidence. This limit is the RAIM protection level for fault detection conditioned upon hypothesis Hj, j=0 to m. The high confidence level with which it bounds navigation error is the RAIM Probability of Detection.

(9) If, after detection, the probability of any one hypothesis Hj, j=1 to m, is greater than 0.999, then the Receiver will stop using measurement j for navigation, and GPS navigation may continue uninterrupted. Otherwise, the RAIM function issues an alert indicating that high integrity GPS navigation is not available.

A variety of RAIM techniques which implement the above principles have been proposed and analyzed in the literature. These techniques are essentially equivalent. A RAIM FDE methodology which provides improved integrity monitoring relative to these prior art RAIM techniques would be a significant improvement in the field.

SUMMARY OF THE INVENTION

A global positioning system (GPS) receiver or navigation apparatus for use on an aircraft is disclosed. The receiver implements improved methods of performing both navigation and fault detection and exclusion (FDE) functions. The GPS receiver includes an antenna adapted to receive GPS satellite signals from each of multiple GPS satellites. Navigation solution determining circuitry coupled to the antenna receives the GPS satellite signals and performs navigation and FDE functions. The navigation solution determining circuitry is adapted to determine, as functions of the received GPS satellite signals, a unique least squares (LS) navigation solution and a unique first navigation solution for receiver position and receiver clock bias. The horizontal position of the first navigation solution for the receiver is offset from the horizontal position of the least squares navigation solution for the receiver. The first navigation solution can be either of a maximal accuracy or a maximal integrity navigation solution.

DETAILED DESCRIPTION OF THE PREFERRED EMBODIMENTS

The present invention includes a GPS receiver implementing an enhanced RAIM FDE methodology which overcomes limitations associated with prior art GPS navigation systems utilizing conventional RAIM methodology.

Figure 1:
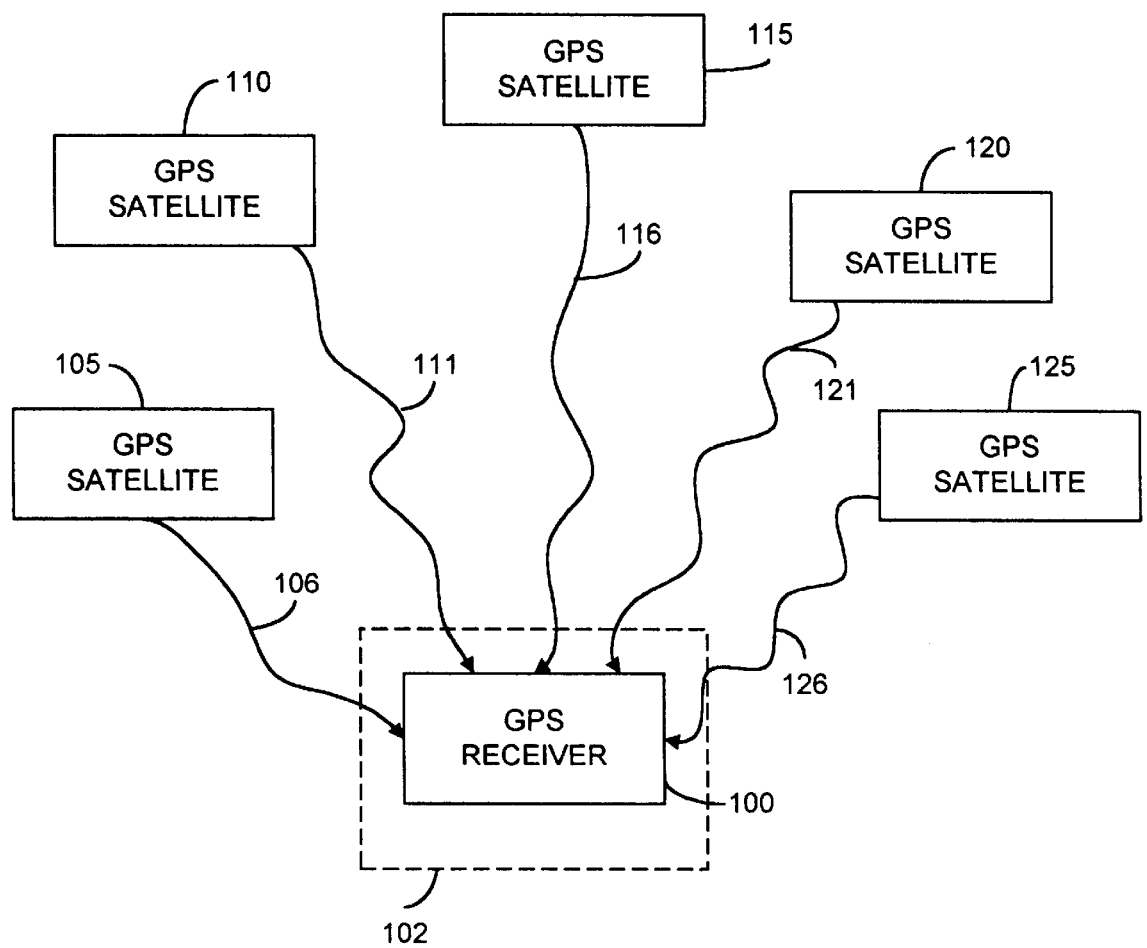
FIG. 1 is a block diagram illustrating a GPS navigation system in accordance with the present invention.
Figure 2:
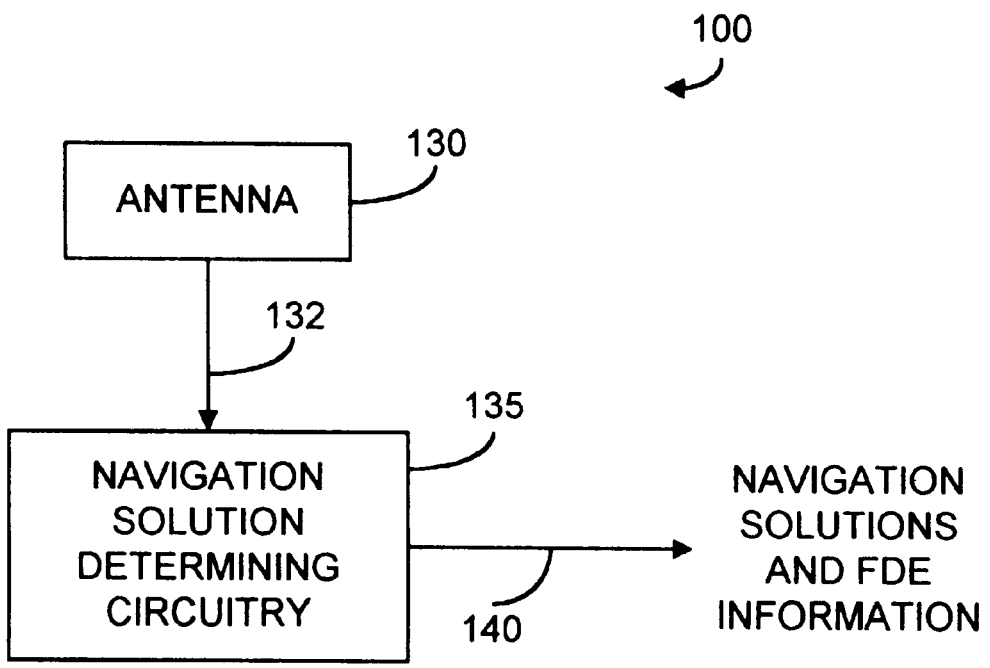
FIG. 2 is a block diagram illustrating in greater detail a GPS receiver of the GPS navigation system shown in FIG. 1.

FIGS. 1 and 2 are block diagrams illustrating GPS receiver 100 implementing enhanced RAIM in accordance with the present invention. In preferred embodiments, GPS receiver 100 is intended for use on aircraft 102, but is not limited to such a use. GPS receiver 100 includes GPS based navigation systems and circuitry adapted to receive GPS satellite signals from multiple GPS satellites (for example GPS satellite signals 106, 111, 116, 121 and 126 from GPS satellites 105, 110, 115, 120, and 125 illustrated in FIG. 1), and to determine a navigation solution based upon the information contained in or measurements derived from the received GPS satellite signals. GPS receiver 100 is also adapted to provide fault detection (FD) and fault detection and exclusion (FDE) using an enhanced RAIM methodology.

In an embodiment of the invention illustrated in FIG. 2, GPS receiver 100 includes antenna 130 and navigation solution determining circuitry 135. Antenna 130 is adapted to receive the GPS satellite signals and to provide output 132, to navigation solution determining circuitry 135, which is indicative of the satellite signals and the information contained therein. Navigation solution determining circuitry 135 is adapted to generate a conventional least squares navigation solution. In accordance with the present invention, circuitry 135 is also adapted to generate one or both of a maximal accuracy (MA) navigation solution and a maximal integrity (MI) navigation solution as part of its FDE functions. The navigation solutions and FDE information generated by circuitry 135 is provided via output 140 to other systems within aircraft 102 for use in navigating the aircraft. Navigation solution generating circuitry 135 can be implemented in a microprocessor programmed to carry out the inventive methods, as well as other known GPS receiver functions. FIGS. 3–10 illustrate methods and functions implemented by GPS receiver 100 in preferred embodiments of the present invention.

Figure 3:
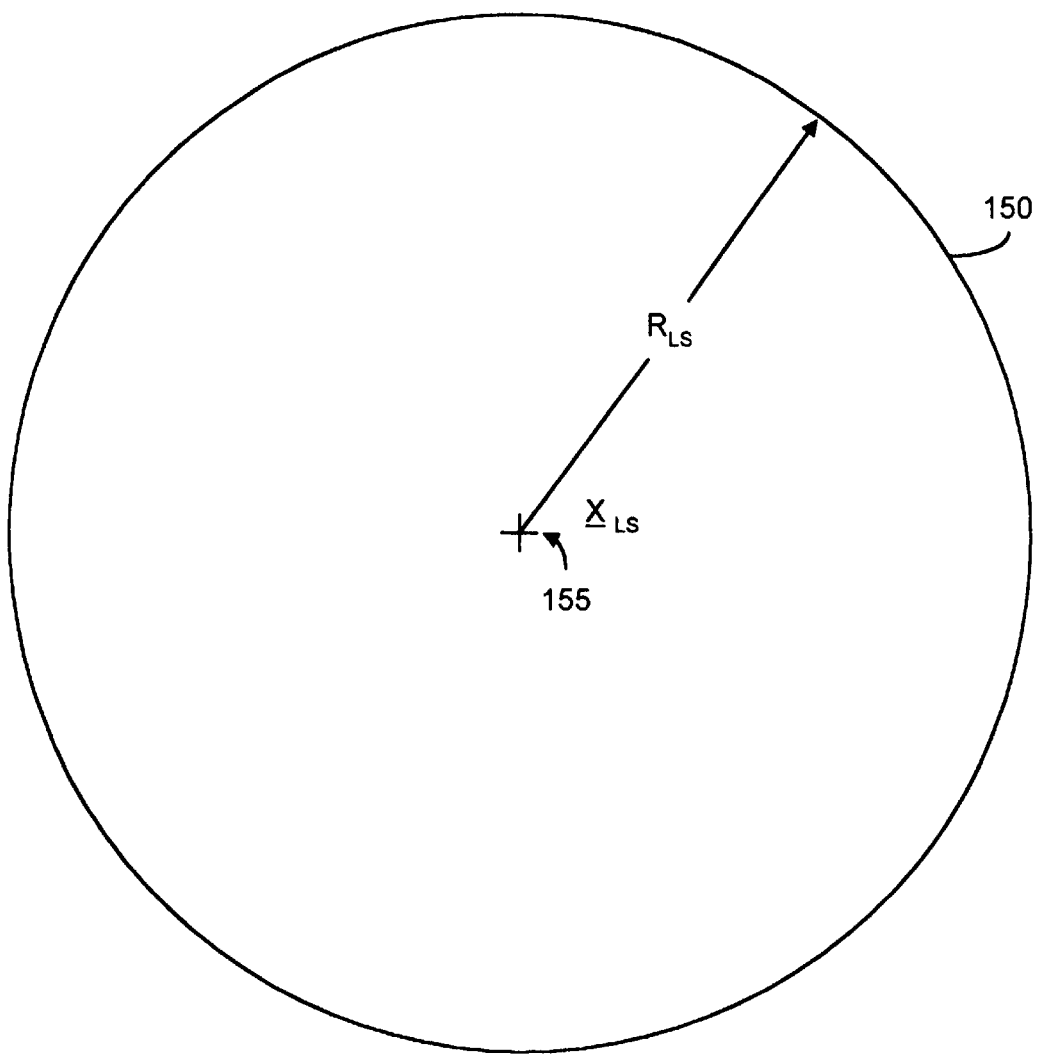
FIG. 3 is a diagrammatic illustration of a prior art least squares navigation solution horizontal position and horizontal uncertainty limit.

FIG. 3 is a diagrammatic illustration of a determined least squares navigation solution horizontal position $x_{LS}$ and a horizontal uncertainty limit (HUL) $R_{LS}$ for aircraft 102 which are determined by circuitry 135 of receiver 100 as a function of information contained in or measurements derived from received GPS satellite signals. HUL for a navigation solution is defined as the radius R of the circle (for example circle 150), centered at the navigation solution horizontal position (for example horizontal position 155), which contains the true horizontal position with a probability, conditioned upon the normalized measurement residual vector y of $1-P_{MD}=0.999$.

A detector is a device or algorithm whose function is to detect the state of a binary variable based upon measurement of certain physical phenomena. The measurement is an observation of the state variable plus some error component—e.g. zero-mean Gaussian white noise.

The performance of a detector is characterized by the probability with which it performs correctly. There are 4 possible outcomes for every decision—two of which are wrong and two of which are right. The two "right" outcomes correspond to correct detection of the state when the state is 0 and when the state is 1. One wrong outcome, called a False Alarm, occurs when the detector thinks the state is a 1 when it is really a 0. The other wrong outcome, called a Missed Detection, occurs when the detector thinks the state is a 0 when it is really a 1.

From a knowledge of the statistical behavior of the state and of the measurement error, it is possible to compute probabilities of occurrence for each of these decision outcomes. The performance of the detector is characterized by its Probability of False Alarm (PFA) and by its Probability of Missed Detection (PMD). Alternatively, performance may be specified by PFA and by Probability of Detection (PD), where PD=1−PMD.

The industry standard for the integrity of primary means GPS navigation equipment (RTCA DO-229) specifies the performance of the RAIM detector. When available, RAIM must have a PFA≦3.333e−7 per decision and a PD≧0.999, which is equivalent to a PMD≦0.001.

To use a determined navigation solution horizontal position, no obstacles should reside within the HUL circle at altitudes near the altitude of the aircraft. The vertical uncertainty limit (VUL) for a navigation solution is defined as the length of the vertical interval above or below the navigation solution for vertical position such that this double amplitude interval contains the true vertical position with a probability, conditioned upon y, of $1-P_{MD}= 0.999$. For ease of illustration, only HUL $R_{LS}$ for the least squares navigation solution is illustrated in FIG. 3. However, the methods of the present invention are applicable to both HUL and VUL.

Like conventional RAIM implementing GPS systems, circuitry 135 of GPS receiver 100 can compute HUL and VUL for the least squares navigation solution conditioned upon hypotheses Hj, j=1 to m. The probability distribution of least squares navigation solution error conditioned upon observation y and hypothesis Hj is Gaussian. Horizontal position 155 $X_{LS}$ and HUL radius $R_{LS}$ illustrated in FIG. 3 are determined by the circuitry of receiver 100 using conventional least squares navigation solution methods.

Computation of HUL for the Maximal Integrity Navigation Solution

Figure 4:
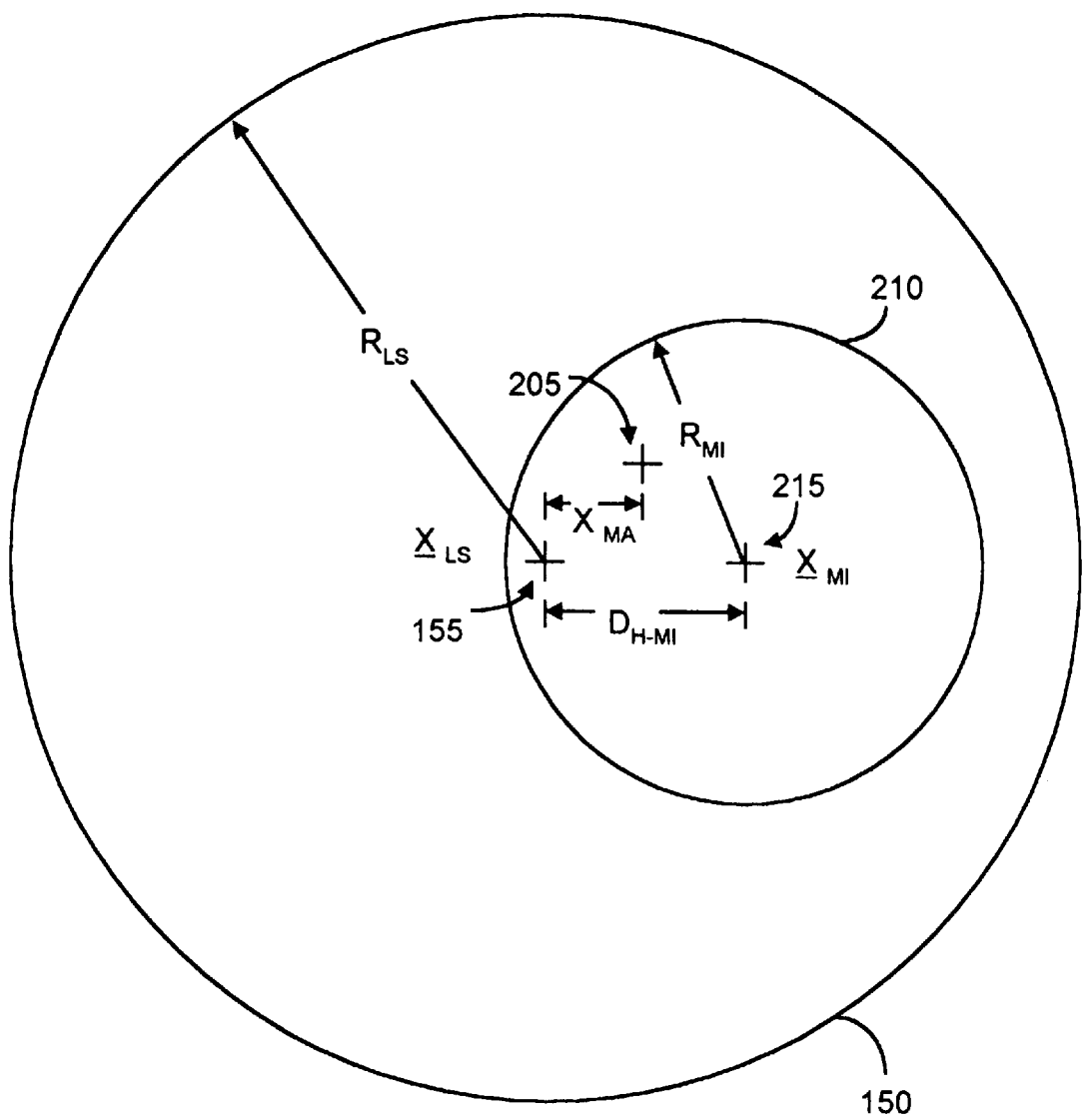
FIG. 4 is a diagrammatic illustration of maximal integrity and maximal accuracy corrections to a least squares navigation solution which are generated by the navigation system of the present invention.

Referring now to FIG. 4, HUL for the MI navigation solution is defined herein as the radius $R_{MI}$ of the smallest circle 210 which contains the true horizontal position of receiver 100 with a probability, conditioned upon y, greater than or equal to 0.999. The location with respect to point 155 of center 215 of circle 210 is otherwise unconstrained. The relationship between circles 150 and 210 is thus: (a) the radius of circle 210 is less than or equal to the radius of circle 150; however (b) circle 210 is not necessarily constrained within circle 150.

The horizontal displacement $D_{H-MI}$ of center 215 of the circle is called the MI horizontal position correction to the least squares navigation solution. When MI position corrections are applied to the least squares navigation solution, the result is described as the MI navigation solution, $X_{MI}$. The horizontal Maximal Integrity navigation solution $X_{MI}$ is located at center 215 of circle 210.

Described below are two methods, which are implemented by circuitry 135 of receiver 100, for computing MI HUL and position corrections to the least squares navigation solution. Using HUL ($R_{MI}$) and navigation solution $X_{MI}$ provides receiver 100 with maximized navigation solution integrity (availability).

Maximal Integrity Navigation Solution HUL Method #1

The first method for computing HUL ($R_{MI}$) for the MI navigation solution is analogous to that for a least squares navigation solution, except that the center $X_{MI}$ 215 of the circle 210 which contains the error is unconstrained. First, from the satellite data the set of measurement residuals is identified whose Probabilities of Culpability are deemed to be significant.

The Probability of Culpability of measurement j is the probability, conditioned upon observation of a measurement set, that measurement j of that set contains a pathological bias. Stated mathematically, Probability of Culpability is defined as P {Hj|y}.

The set of probabilities P {Hj|y}, j=0 to m, are used in the computation of HUL and in the decision to exclude a satellite measurement. Both of these areas of performance have the requirement PD≧0.999. That is, at all times the integrity circle must bound navigation solution error with a certainty of 99.9%, and, after an alarm it must be 99.9% sure that a measurement j is the one containing the pathological bias before it is excluded.

Associated with each of these measurement residuals j is a circle in horizontal space of radius cep999 (j) offset by $m_j$ from the location of the Least Squares navigation solution. Next, the MI navigation solution HUL computation method addresses the plane geometry problem of computing the center and radius of the smallest circle which contains all of the smaller circles, j.

The first HUL method is a geometry solution. For each hypothesis Hj the following can be computed:
(1) A probability of culpability, or P {Hj|y }.
(2) The mean and variance of a Gaussian probability distribution which describes North and East position error and which is conditioned jointly upon y and the premise that Hj is true.
(3) The 0.999 Circular Error Probable (CEP999) associated with the horizontal position error probability distribution. In this context, CEP|Hj is defined as the radius of the circle centered at mj such that the probability that true user position is within this circle is 0.999. Computation of CEP is well known in the art.

Figure 5:
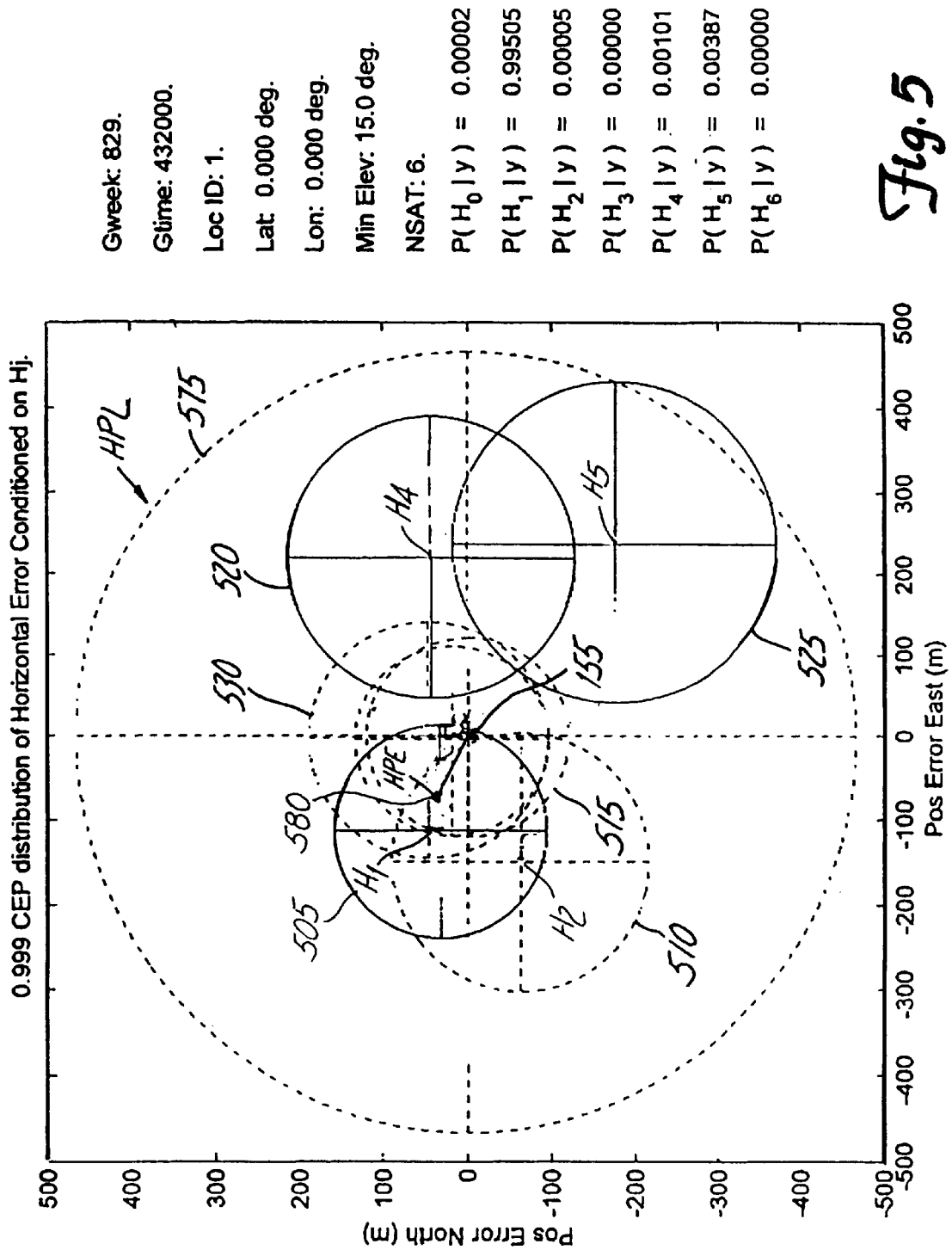
FIGS. 5–8 are diagrammatic illustrations of a horizontal aircraft position which shows various features of the invention.

FIG. 5 illustrates these computations for an actual six measurement scenario. Associated with each Hj, j=0 to m, is a probability of culpability (POC), a mean horizontal position error mj, and a CEP999 circle (circles 505, 510, 515, 520, 525 and 530) centered at mj which would contain true user horizontal position with a probability≧0.999 were Hj to be true.

Figure 6:
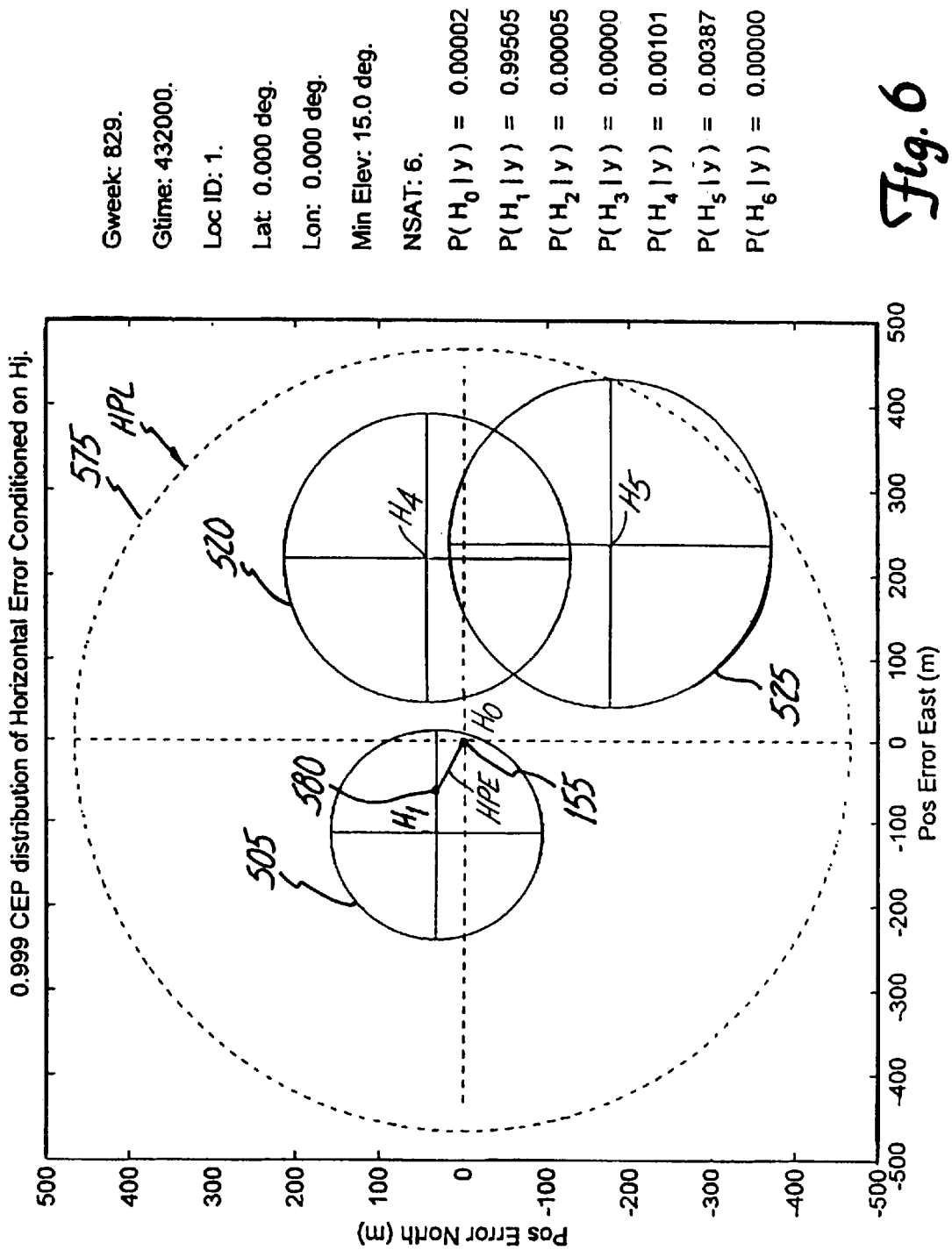
Figure 7:
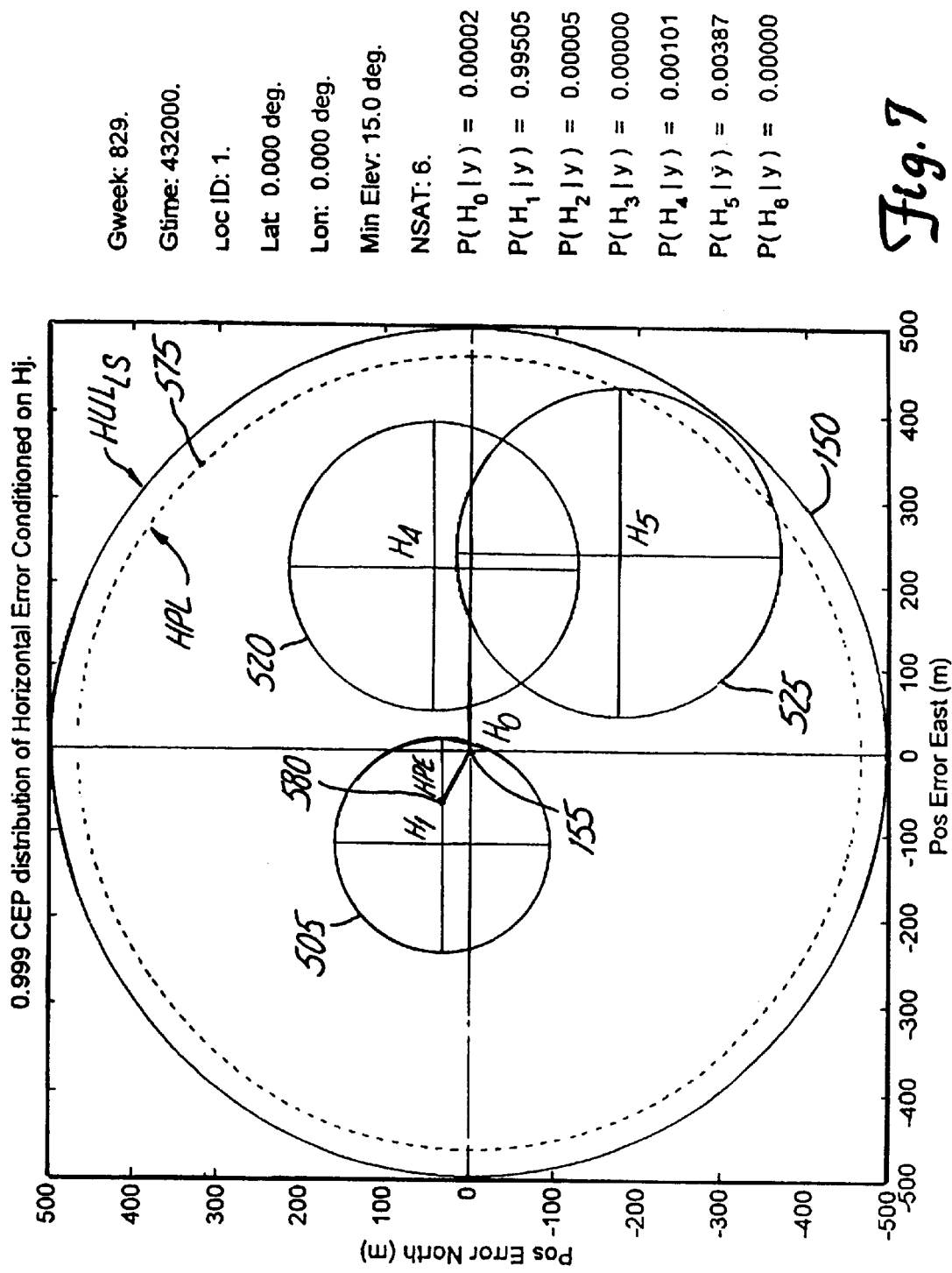
Figure 8:
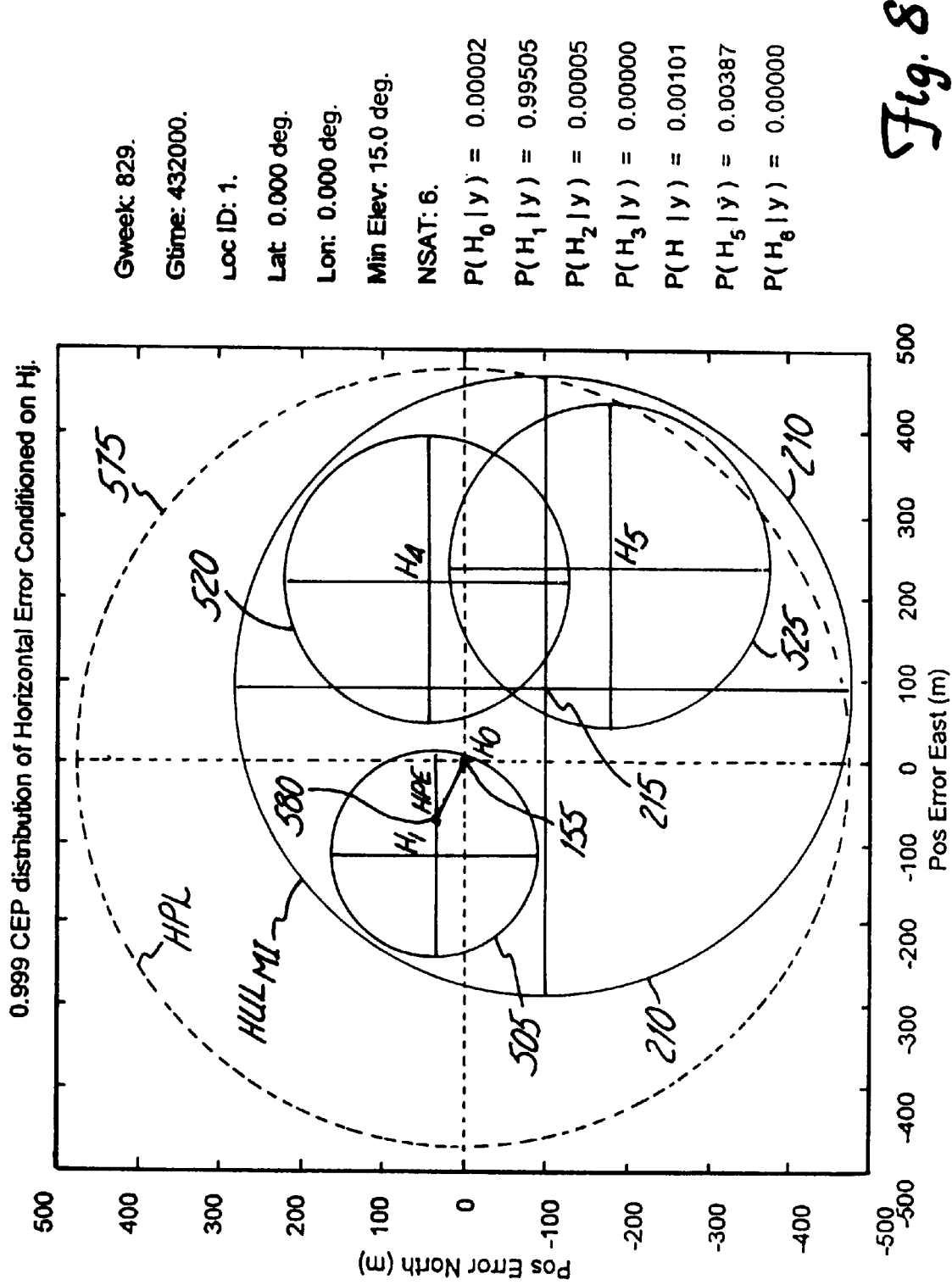

The goal of a HUL computation is to compute a value for HUL such that the radius of HUL contains true user position with a probability, conditioned upon observation of y, which is ≧0.999. In the first HUL computation method the following steps are performed:
(1) Allocate half of the PMD budget, 0.0005, to the measurements with the lowest probabilities of culpability. Start with the measurement with the smallest POC, then select the measurement with second largest POC and add it to the first POC. Repeat this with third smallest POC, etc. until the sum of the POCs is less than 0.0005 AND the next measurement would put the total probability over 0.0005. Count the number of measurements in this group and refer subsequently to this number as 'n'. Note that 0≦n≦m.
(2) Disregard these 'n' measurements. Regardless of how the HUL circle is drawn, the total contribution of these measurements to the probability of a hazardous navigation error is less than 0.0005.
(3) For the remaining, significant satellites, compute and plot the 0.999 CEP radii as shown in FIG. 6 where CEP circles 505, 520 and 525 correspond to the measurements from the "significant" satellites.
(4) If this first method is for the Least Squares solution, the HUL radius is the radius of the circle centered at $X_{LS}$ and tangent to the most outlying CEP circle among the significant POC measurements. This is depicted in FIG. 7 which illustrates Least Squares HUL circle 550.
(5) If this first method is for the Maximal Integrity solution, the HUL radius is the radius of the circle which is tangent to three or more outlying CEP circles (among the significant POC measurements) and which contains the CEP circles of the remaining significant POC measurements. This is depicted in FIG. 8 which illustrates MI HUL circle 560.

Note that the word "half" as used above involves dividing the PMD processing budget evenly between the significant POC measurements and the insignificant POC measurements. A more sophisticated algorithm might allocate this budget based upon the observed POC's. For example, assume a 7 measurement case in which the 3 smallest POC measurements have a total POC of 0.0002 and the 4th smallest POC measurement has a POC of 0.0009. Adding this 4th measurement to the set of insignificant measurements would exceed the PMD budget. The 4 most significant POC satellites, with a cumulative POC of 0.9998, have a PMD budget of 0.001−0.0002=0.0008. Accordingly, the algorithm could improve HUL slightly by computing 0.9984 CEP circle for these 4 significant measurements. The first HUL method would be slightly smaller because, for each significant measurement, 0.9984 CEP is slightly smaller than 0.999 CEP.

Each of FIGS. 5, 6, 7 and 8 are a depiction of horizontal position, East and North, in meters. The case described is a set of six measurements y which produces a certain unique Least Squares navigation solution. The location of the Least Squares navigation solution 155 is shown at the center (origin) of each plot. The locations of all other features are presented in terms of the relative location of each with respect to the Least Squares solution.

In the case presented here, the measurement set y features the nominal zero-mean mutually independent Gaussian biases on all measurements, plus a pathological bias on the first measurement equal to eleven times the 1-sigma value of the nominal measurement bias. As stated above, the Least Squares position solution 155 obtained from y is shown at the origin. The horizontal protection level (HPL) value 575 computed for this measurement geometry is depicted as the dotted line circle centered at the Least Squares position solution (i.e., centered on the plot origin).

The actual true user position upon which y is at the point 580 from which vector HPE extends. The vector HPE thus represents the actual error in the Least Squares navigation solution. Referring to FIG. 5, from observation of y, one can compute two data for each hypothesis Hj:
(1) The probability of each of the hypotheses $H_0$ thru $H_6$, exactly one of which is true.
(2) A 0.999 CEP circle, which if Hj were known to be the true hypothesis, would contain the true user position with a certainty of 0.999.

These 0.999 CEP circles (circles 505, 510, 515, 520, 525 and 530), for Hj, j=0 to 6, are plotted in FIG. 5. Also presented along side FIG. 5 are the computed Probabilities of Culpability P for each measurement, i.e., the probabilities that each hypothesis Hj, j=0 to 6, is true, conditioned upon observation of y.

Referring now to FIG. 6, the "prime suspects" (those hypotheses which are most probable and whose combined probability is $\geq 0.9995$) are identified. There are 3 prime suspects: hypotheses 1, 4 and 5. FIG. 6 shows the 0.999 CEP circles 505, 520 and 525 for these three hypotheses. From this point forward, the remaining hypotheses are ignored. Wherever they are, they together have less than 0.0005 probability of having any relevance to the value of the true user position.

Referring now to FIG. 7, this the standard HUL circle 150 centered at the Least Squares solution is shown. Because hypothesis 5 has a significant probability, 0.00387, of being true, the HUL circle 150 must enclose the 0.999 CEP circle 525 for this hypothesis. Even if the CEP circles for all of the "non-prime-suspect" hypotheses were to lie outside of this HUL circle 150, the probability of containing true user position within the HUL circle, which is equivalent to the probability of bounding the horizontal position error in the least squares navigation solution, would be at least:

$$0.9995 \cdot (P\{H_1 \mid y\} + (P\{H_1 \mid y\} + (P\{H_1 \mid y\}) = 0.9995 \cdot (0.99993)$$

$$= 0.99943 \text{ (which is} \geq 0.999)$$

Note that the coefficient 0.9995 arises from the fact that the CEP circles are eccentric with respect to HUL. The probability that user position|Hj falls outside of the 0.999 CEP circle for Hj and on one particular side of any line drawn thru the center of this CEP circle is 0.0005.

Were CEP circle 525 for hypothesis 5 to lie outside the HUL circle, the probability of containing true user position within the HUL circle, which is equivalent to the probability of bounding the horizontal position error in the least squares navigation solution, would be less than or equal to 1−0.000387, which is less than the required bounding certainty of 0.999. The radius of HUL circle 150 is 496.716 meters. HPL 575 is 465.861 meters.

Referring now to FIG. 8, the first method of computing the HUL circle for the Maximal Integrity solution is depicted. By freeing the MI HUL circle 210 from the constraint of being centered at the Least Squares solution 155, it is possible to compute a smaller radius circle which has all of the specified properties of the HUL circle described in FIG. 7 (i.e., it too contains true user position with the same certainty>0.99943). The radius of MI HUL circle 210 is 368.231 meters. The center 215 of the FIG. 8 HUL circle 210 is called the Maximal Integrity solution. Note that in this particular example, the actual error in the Maximal Integrity position solution is about twice as great as the error HPE in the Least Squares solution. However, the 0.999 certainty bound upon the Maximal Integrity position solution is much smaller than that upon the Least Squares solution.

The first method for computing HUL ($R_{MI}$) for the Maximal Integrity (MI) navigation solution 215 is illustrated in the flow diagram of FIG. 9 and is described below.

(1) As illustrated at block 650, the set C' is found of 'n' measurements j having the smallest 'n' values for pculp(j) such that 'n' is maximized. The term pculp(j) is another way of referring to P{Hj|y}, or the Probability of Culpability for measurement j. The concept of the 'n' measurements comprising the set of insignificant POC measurements is discussed above.

(2) As illustrated at block 655, CEP999(j) for each measurement j in set C is computed. CEP999(j) is another way of referring to the 0.999 CEP radius for measurement j. A function of the variance A of navigation solution error conditioned upon hypothesis Hj and observation y, CEP999 is the radius of the circle centered at the point offset by vector mj from the location of the Least Squares navigation solution such that true user position lies within this circle with a probability$\geq 0.999$. Computation of 0.998 CEP and 0.999 CEP is well known in the art.

(3) As illustrated at block 660, for each measurement j in set C, the vector $s_j$ in the direction of the horizontal projection of $m_j$ is computed along with the length of vector $s_j$:

$$|s_j| = hbias(j) + cep999(j)$$

where $s_j$ is an intermediate variable in the computation of the center and radius of the Maximal Integrity HUL circle. As the computations converge to the solution for this circle, the values $s_j$ for all significant measurements j converge to a single value, which is the radius of this HUL circle. The term hbias(j) is the horizontal position component of $m_j$, the mean of Least Squares navigation solution error conditioned upon Hj and y.

(4) At block 665, the set of 3 vectors si which are maximally distant from each other are identified.

(4)(a) At block 670, the pair of vectors of this three vector set which are most distant are determined.

(4)(b) The third vector in the triad is the vector which has the largest projection upon the difference vector between the first two vectors.

Figure 9:
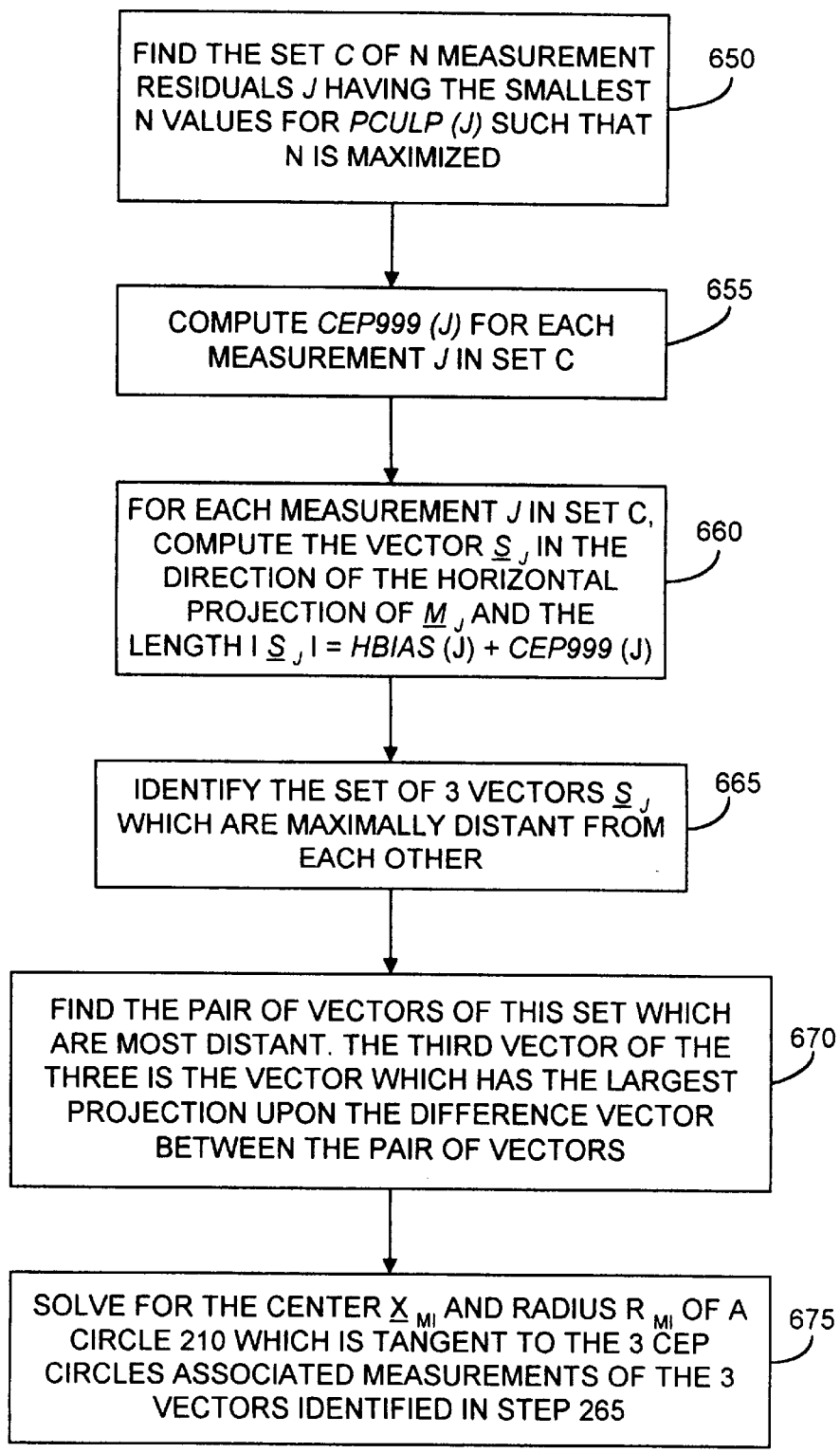
FIG. 9 is a flow diagram illustrating a first method of determining the maximal integrity correction to the least squares navigation solution in accordance with first embodiments of the present invention.

(5) At block 675, solve for the center $X_{MI}$ 215 and radius $R_{MI}$ of the circle which is tangent to the 3 CEP circles associated with the 3 measurements identified in Step (4) (block 665 of FIG. 9).

Maximal Integrity Navigation Solution HUL Method #2

The second method for computing HUL radius $R_{MI}$ for the MI navigation solution is identical to that for determining the least squares navigation solution, except that the Newton-Raphson (N-R) loop models the protection circle 210 of radius $R_{MI}$ as centered at the point $x_{MI}$ 215. The second method for computing HUL for the least squares solution requires approximately 10 fold greater computational resources. However, the resulting computation of HUL is accurate to less than 0.1 meter error, and the corresponding actual PMD is precisely computed. The second method for computing HUL is the "brute force" evaluation of the following composite horizontal position error probability density function:

$$p(x \mid \underline{y}) = \sum_{j=0}^{m} pculp(j) \cdot p(x \mid \underline{y}, H_j)$$

where x is horizontal position error vector, $p(x|y,H_j) \sim N(m_j, \Lambda_j)$ and where pculp(j)=P $\{H_j|y\}$, j=0. This PDF is quadratured within the circle of radius R, centered at $X_{LS}$, for each of the hypotheses $H_j$. The function which does this returns the probability Pj=P $\{|x|<R|y, H_j\}$ and dPj/dR. A Newton-Raphson loop (or equivalent numerical routine) calls this function for every hypothesis j, j=0 to m on every pass until the solution for R converges to a value such that:

$$\sum_{j=0}^{m} pculp(j) \cdot P_j = 0.999$$

Inputs:

| Variable | Description |
|---|---|
| $m_j$ | Mean of $\underline{x}_{LS}$ conditioned on $\underline{y}$ and on $H_j$, any j = 0 to m. |
| $\Lambda_j$ | Variance of $\underline{x}_{LS}$ conditioned on $\underline{y}$ and on $H_j$, any j = 0 to m. |
| P { $H_j$ \| $\underline{y}$ }, j = 0 to m | Probability of hypothesis $H_j$, j = 0 to m, conditioned upon observation $\underline{y}$. |
| R | Initial estimate for HUL. |

Outputs:

| Variable | Description |
|---|---|
| HUL | HUL for the least squares navigation solution. |

Computations:

(1) Initialize R to the value of HUL computed via method #1.

(2) For each hypothesis Hj, j=0 to m, evaluate Pj(R) and (dPj/dR) (R).

(3) Compute $P(R) = P\{|x| < R \mid \underline{y}\}$ $$= \sum_{j=0}^{m} pculp(j) \cdot P\{|x| < R \mid \underline{y}, H_j\}$$

Also $$\text{compute } (dP/dR)(R) = \sum_{j=0}^{m} pculp(j) dP \left. \frac{\{|x| < R \mid \underline{y}, H_j\}}{dR} \right| (R)$$

(4) Compute delta R=(0.999−P)/(dP/dR).

(5) R=R+delta R.

(6) Repeat Steps (2) thru (5) until R converges to a value such that P=0.999.

(7) Return HUL=R.

Computation of the Maximal Accuracy Correction to the Least Squares Navigation Solution In preferred embodiments, circuitry 135 illustrated in FIG. 2 is also adapted to determine a maximal accuracy (MA) correction to the least squares navigation solution 155. The MA correction to the least squares navigation solution is based upon position data not used by navigation solution generating circuitry 135 in determining the least squares solution. These additional data are:

(1) The assumptions regarding the uniqueness of the pathological measurement bias. The least squares solution implicitly treats this bias as zero. The Least Squares is, by definition, predicated upon the assumption that P{Ho}=1 and that P{Hj}=0 for j=1 to m; and (2) The probabilities of culpability computed from observation of y. Observation of y provides a better estimate P{Hj}, j=0 to m. Accordingly, the MA solution, which uses this additional information, is more accurate than the Least Squares navigation solution.

The MA horizontal position navigation solution 205 is equal to the least squares horizontal position navigation solution $X_{LS}$ 155 with this MA correction $x_{MA}$ added. No value of HUL or VUL is computed for the MA navigation solution.

Inputs:

| Variable | Description |
| --- | --- |
| $m_j$ | Mean of $\underline{x}_{LS}$ conditioned on $\underline{y}$ and on $H_j$, any j = 0 to m. |
| $P\{H_j \mid \underline{y}\}$, j = 0 to m | Probability of hypothesis $H_j$, j = 1 to m, conditioned upon observation $\underline{y}$. |

Outputs:

| Variable | Description |
| --- | --- |
| $\underline{x}_{MA}$ | Maximal Accuracy correction to the least squares navigation solution. |

Computation of $X_{MA}$:

$$x_{MA} = -\overline{x \mid \underline{y}} = -\sum_{j=0}^{m} [\overline{x \mid \underline{y}, H_j}] \cdot P\{H_j \mid \underline{y}\},$$

where $\underline{m}_j = \overline{x \mid \underline{y}, H_j}$

The computation of $x_{MA}$ is −1 times the mean, or expected value, for navigation solution horizontal position error evaluated over the conditional probability distributions for each Hj and over the distribution of the probabilities of the events Hj themselves. The mean of each conditional probability is $m_j$. The probabilities of the conditions Hj are the probabilities of culpability P{Hj|y}.

Using the MA navigation solution 205 determined by the MA correction $X_{MA}$ to the least squares navigation solution horizontal position $X_{LS}$ 155, circuitry 135 provides for use by the receiver 100 a horizontal position having a maximized likelihood of being the actual horizontal position of the receiver.

Figure 10:
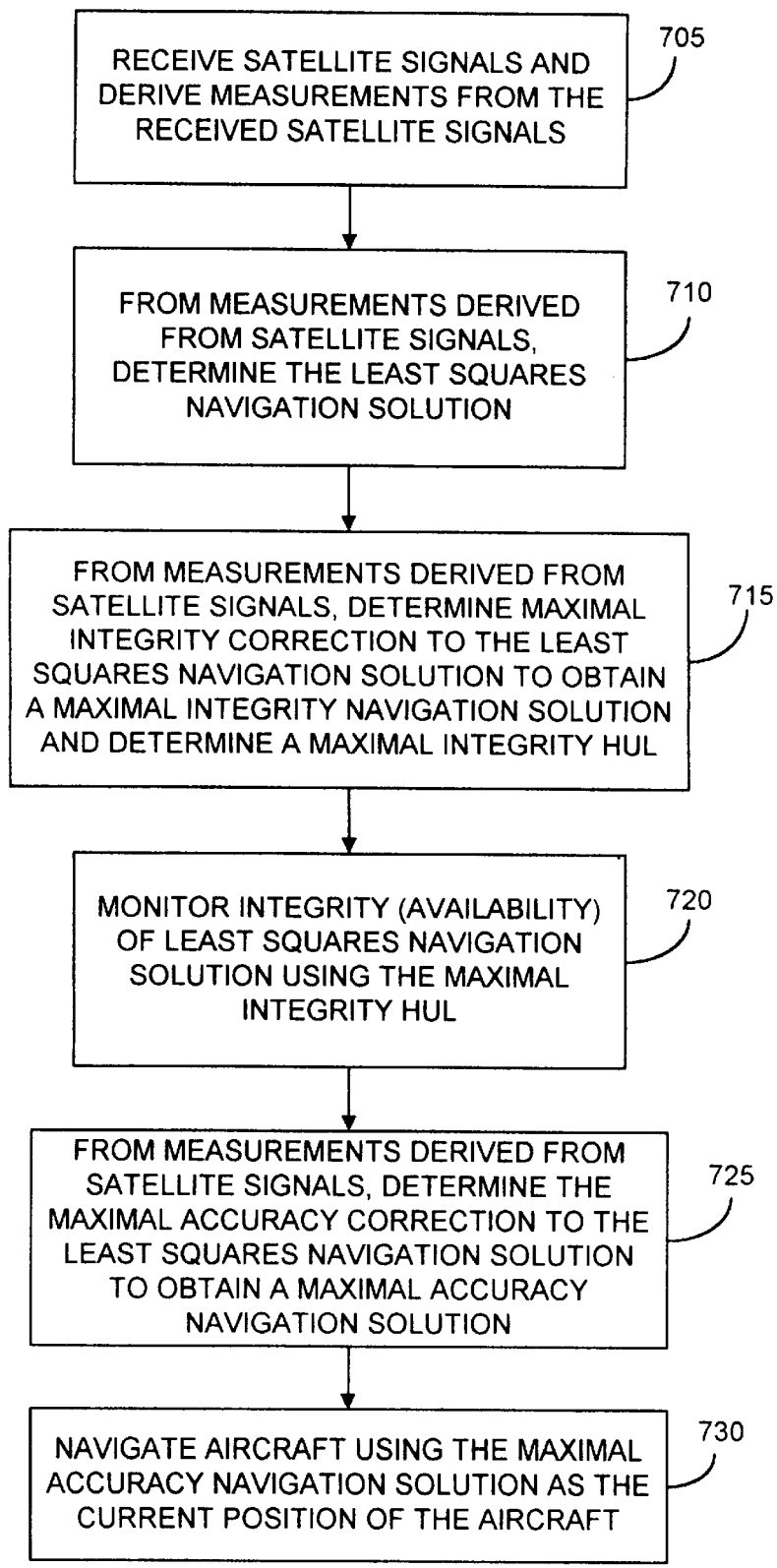
FIG. 10 is a flow diagram illustrating a method of determining the availability and accuracy of a navigation solution in accordance with some embodiments of the present invention.

FIG. 10 is a block diagram illustrating one preferred method of navigating aircraft 102 using GPS receiver 100 and the enhanced RAIM methods of the present invention. As illustrated in block 705, GPS satellite signals are received and measurement residuals are derived from the received satellite signals. As shown at block 710, from the measurements derived from the satellite signals, the least squares navigation solution is determined using any known technique.

As shown at block 715, from measurements derived from the satellite signals, an MI correction $D_{H-MI}$ to the least squares navigation solution horizontal position is determined to obtain the MI navigation solution $X_{MI}$ 215. Likewise, from the derived measurements, the MI HUL $R_{MI}$ is determined. As shown at block 720, the integrity (availability) of the least squares navigation solution is monitored using the MI HUL $R_{MI}$. Using the MI HUL $R_{MI}$, instead of the least squares HUL $R_{LS}$, results in the navigation solution satisfying integrity monitoring requirements when it would not using the least squares HUL $R_{LS}$.

As shown at block 725, from measurements derived from the satellite signals, the MA correction $x_{MA}$ to the least squares navigation solution $x_{LS}$ is determined. Using the MA correction $x_{MA}$, the MA navigation solution 205 is determined. Then, as shown at block 730, aircraft 102 is navigated using the MA navigation solution as the current position of the aircraft instead of using the least squares navigation solution as the current position. Although the MI and MA navigation solutions are both used in some embodiments of the present invention, either of these two navigation solutions can be used in FDE separately to improve navigation and FDE of receiver 100.

Computation of Detection Thresholds

Navigation solution determining circuitry 135 compares the FDE test statistic vector against a PFA threshold to determine whether or not the threshold was exceeded indicating the high probability (i.e., >=1−PFA) of the existence of a pathological bias, and to determine the measurement j most likely to contain the pathological bias. The FDE test statistic vector q is defined below. Each of the m elements of vector q is equal to the projection of the parity vector upon the characteristic line for measurement j. These values are used to compute P{Hj|y}, j=1 to m. The FDE test statistic is a scalar value equal to the largest absolute value among the elements of q. The FDE test statistic is compared against the RAIM detection threshold. The term PFA threshold represents a RAIM detection threshold computed to deliver a certain Probability of False Alarm.

The FD detector functions implemented by circuitry 135 perform two tasks:

(1) Deciding, based upon the relative magnitudes of the elements of the FDE test statistic, $q=\{e_j/\sqrt{s_{ij}}\}$, which of the hypotheses $H_j$, j=1 to m, is most likely to be true. This j is identified as jmax.

(2) Comparing element jmax of the FDE test statistic against a threshold $T_{jmax}$.

As used herein, the detection threshold $T_{jmax}$ has a somewhat different significance as compared to the conventional concept of FDE as embodied in current government and industry standards DO-208, TSO-C129a, and DO-229. As currently specified by DO-208, TSO-C129a, and DO-229, the condition, $|q^2{}_{jmax}>T_{jmax}$, is treated as an internal alarm, requiring the receiver, within some short grace period, either to identify the faulty measurement and remove it from the navigation solution or to declare its GPS navigation solution to be invalid. According to the FDE of the present invention, FD alarm is not necessary per se. The industry requirement for eliminating the error source within a specified grace period following detection translates to the following:

"The total error in the navigation solution shall not exceed the current values of HUL and VUL for a continuous period of more than <specified grace period> number of seconds."

According to the present invention, the threshold exceedance alarm merely triggers the computation and application of an additional correction to the navigation solution—a contingency position correction which corrects for the likely presence of a pathological measurement bias on measurement jmax. At all times during GPS navigation—in the presence or absence of a FD threshold exceedance—the fully FDE capable GPS receiver of the present invention continuously computes and outputs a MI navigation solution and HUL—the center offset and radius of a horizontal circle which is guaranteed to contain the current navigation solution to a certainty $\geq 1-$PMD.

The schedule of detection thresholds is not arbitrarily chosen. The thresholds are selected to ensure with high probability (e.g., 1−PFA) that a threshold exceedance implies the existence of a pathological bias. The goal of FDE according to the present invention is in this respect essentially the same as that of conventional FDE, even though there is no direct impact upon operational probability of False Alert.

In both the conventional and the present invention FDE, the values for $T_j$ are selected to deliver a certain desired false alarm rate. Note that, when $H_o$ holds, the Least Squares, MI, and MA navigation solutions and protection radii are identical. No additional information can be obtained from the FDE test statistic when the probabilities of Hj, j=1 to m, are insignificant.

Inputs:

| Variable | Description |
| --- | --- |
| $\underline{Q}$ | The FDE test statistic vector. $\underline{Q} = \{\underline{f}_j\}^T \cdot \underline{p}$ |
| $\underline{T}$ | Set of m FDE detection thresholds predicated upon some desired PFA. |

Outputs:

| Variable | Description |
| --- | --- |
| jmax | Detection result. 0 = no detection. 1 .. m = detection, on measurement j. |

Computations:
(1) jmax=index of largest amplitude element of q.
(2) jmax=jmaX*($q_{jmax}$>$T_{jmax}$)

Computation of HPL, VPL, and LPL conditioned upon hypothesis Hj

Circuitry 135 computes horizontal protection level (HPL), vertical protection level (VPL) and lateral protection level (LPL) for the least squares navigation solution conditioned upon hypothesis Hj, j =1 to mn. HPL for a navigation solution is defined as the radius of the circle centered at the navigation solution horizontal position which contains the true horizontal position with a probability of 1−$P_M$D=0.999, conditioned upon an statistical y constrained such that $$\max_{i=1}^{m}(q_i^2) == T_i,$$

where, $q=\{e_j/\sqrt{s_{jj}}\}$, j=1 to m.

VPL for a navigation solution is defined as the length of the vertical interval above or below the navigation solution for vertical position such that this double amplitude interval contains the true vertical position with a probability of 1−$P_{MD}$=0.999, conditioned upon a statistical y similarly constrained. LPL for a navigation solution is defined a distance such that the amplitude of the horizontal component of navigation solution for position error in the direction of vector l is less than or equal to this distance a probability of 1−$P_{MD}$=0.999, conditioned upon a statistical y similarly constrained. LPL is similar in concept to VPL, except that it is a bound on lateral error instead of vertical error. Lateral error in this context is defined as the linear component of navigation solution position error which is horizontal and at right angles to a desired bearing—e.g., the direction of a runway.

It can be demonstrated that, when conditioned upon hypothesis Hj and upon a statistical y constrained as describe above, the least squares navigation solution error has a Gaussian distribution which is bounded as follows:

$$x_{LS}|H_j \sim N(m_j, \Lambda_j), j=0 \text{ to m}.$$

where
$m_0$=0
$m_j$=$f_j T_j$
$\Lambda_0$=Grms
$\Lambda_j$=Grms+$f_j f_j^T$

Inputs:

| Variable | Description |
| --- | --- |
| W, G, A, S, Grms and $F = \{ f_j \}$ | FD variables derived from measurement geometry. |
| $n_3$ | Local vertical unit vector at LS navigation solution for position. |
| $\underline{L}$ | Local crosstrack unit vector at LS navigation solution for position. |
| Function cep998($\Lambda_j$) | 0.998 confidence CEP function. |
| Function cep999($\Lambda_j$) | 0.999 confidence CEP function. |

Outputs:

| Variable | Description |
| --- | --- |
| HPL | Horizontal protection level for the least squares navigation solution. |
| VPL | Vertical protection level for the least squares navigation solution. |

Computations:
(1) For each of measurements j, j=1 to m,
    (a) Compute $\Lambda|H_j$, the variance of $x_{LS}$ conditioned upon the truth of hypothesis $H_j$.

$$\Lambda|H_j = \text{Grms} + (a_j a_j^T)/s_{jj}$$

(b) Compute $\Lambda_{vert}|H_j$, the variance of the vertical component of $\Lambda|H_j$.

$$\Lambda_{vert}|H_j = U_V^T (\Lambda|H_j) U_V$$

where $U_V^T = [n_3^T \ 0]$
$n_3$ is the unit vector in the direction of true vertical at the current computed user position.

(c) Compute $\Lambda_{lateral}|H_j$, the variance of the runway lateral crosstrack component of $\Lambda|H_j$.

$$\Lambda_{lateral}|H_j = U_L^T (\Lambda|H_j) U_L$$

where $U_L^T = [l^T \ 0]$
l is the unit vector which is horizontal and normal to runway centerline.

(e) Compute HPL conditioned upon each of the hypotheses $H_j$, j=1 to m.

$$HPL|H_j = |U_H^T \cdot f_j|T_j + CEP998(\Lambda|H_j)$$

where $U_H^T=[1\ 1\ 1\ 0]-[n_3^T\ 0]$
  $n_3$ is the unit vector in the direction of true vertical at the current computed user position.
(f) Compute VPL conditioned upon each of the hypotheses $H_j$, j=1 to m.

$$VPL|H_j = U_V^T \cdot f_j T_j + 3.2905\sqrt{\Lambda_{vert}|H_j}$$

(g) Compute LPL conditioned upon each of the hypotheses $H_j$, j=1 to m.

$$LPL|H_j = U_L^T \cdot f_j T_j + 3.2905\sqrt{\Lambda_{lateral}|H_j}$$

(2) Compute HPL, VPL and LPL.

$$HPL = \max_{j=1}^{m}(HPL|H_j)$$

$$VPL = \max_{j=1}^{m}(VPL|H_j)$$

$$LPL = \max_{j=1}^{m}(LPL|H_j)$$

HPL|Hj is the 0.999 confidence bound upon horizontal position error so distributed.

It is standard industry practice to use the detection threshold for all measurements. In this case the values of HPL|Hj vary widely among the set of measurements because of the unique relationship of each measurement's observation vector to those of the other measurements. The unique contribution of each measurement observation vector to the measurement set observation geometry causes the values of $m_j$ and (Variance j), described above, to vary widely from measurement to measurement.

HPL for the measurement set is the maximum of the HPL|Hj values among the hypotheses j=0 to m. Let jmax identify the hypothesis whose associated conditional HPL value, HPL|Hj, is the largest.

It follows that HPL for the measurement set can be reduced by reducing the amplitude of HPL|Hjmax. This is readily accomplished by decreasing the value of the detection threshold associated with measurement jmax. As the detection threshold is decreased, the probability of experiencing a false alarm attributed to measurement jmax increases.

The total Probability of False Alarm (PFA) for the measurement set is the weighted sum of the PFAs associated with the various individual measurements. The relative weighting associated with each measurement is a function of the measurement geometry. The PFA associated with each measurement is a function of the detection threshold used for that measurement. The total PFA of the measurement set can be thought of as a budget allocated among the measurements in the measurement set.

Accordingly, an increase in the PFA allocation for measurement jmax associated with the reduction in detection threshold for measurement jmax requires a commensurate reduction in the PFA allocations for the remaining measurements to maintain the value of total detector PFA. The reduction in PFA for each of these other measurements increases it associated detection threshold and its value of HPL|Hj. As long as the new, higher value of HPL|Hj for each of these other measurements does not exceed the new, lower value for HPL|Hjmax, the reallocation of PFA among the measurements results in a lower value of HPL for the measurement set while maintaining the total PFA value of the measurement set. HPL is minimized for a given value of measurement set PFA when the set of detection threshold Tj is selected so that all HPL|Hj, j=0 to m, have the same value.

Circuitry 135 uses measurement geometry to compute a set of detection thresholds, Tj, such that all HPL|Hj, j=0 to m, have the same value, and HPL is minimized while the PFA associated with the measurement set is maintained. This objective is accomplished via the method described in the following paragraphs.

The nature of the FD comparison method of the present invention, Max versus j of $(e_j^2/s_{jj})<>Tj$, is that parity space is partitioned into 2m sectors by the m characteristic lines of the observation geometry. The 2 sectors associated with measurement j comprise those points in parity space which are "closer" to the characteristic line for measurement j than to the characteristic line of any other measurement. "Closeness" of a parity space point to a characteristic line is measured by the absolute value of the dot product of the point with the unit vector which lies in the direction of the characteristic line.

PFA performance is an issue only when the $H_0$ is in effect. When $H_0$ holds, the direction of the parity vector is uniformly distributed. Hence, when $H_0$ holds, the likelihood of the largest absolute valued element of $\{e_j^2/s_{jj}\}$ being associated with any measurement j is proportional to the relative size of the parity space partition associated with that measurement per the "closeness" criterion described above.

Circuitry 135 of the present invention computes the relative size of the parity sectors associated with each measurement as a percentage of total parity space. Circuitry 135 then uses a Newton-Raphson loop to compute a value of HPL such that the desired PFA is achieved for the set of thresholds $T=\{T_j\}$ computed from this value of HPL. Alternatively, the method can be used to equalize and minimize VPL or LPL.

Inputs:

| Variable | Description |
|---|---|
| W, G, A, S, Grms and $F = \{f_j\}$ | FD variables derived from measurement geometry. |

Outputs:

| Variable | Description |
|---|---|
| T | Set of detection thresholds which minimizes HPL (or VPL, or LPL) while providing the specified PFA. |

Computations:
(1) Compute the uniform threshold value T, which, when applied to all m measurements yields the specified PFA.

$$T = \text{ChisquareCDF}^{-1}(m, 1-PFA)$$

(2) For each measurement j, compute the boundaries of the two sectors of parity space which comprise those points p in parity space which satisfy the following criterion:

$$\text{abs}(\hat{r}_j^T \cdot p) == \max_{i=1}^{m}(\text{abs}(\hat{r}_i^T \cdot p))$$

where $\hat{r}_{ii}$ is the unit vector in the direction of the characteristic line for measurement i.

NOTE #1: $\hat{r}_i = \text{diag}(\sqrt{s_{ii}})P$, where P is the (m−4) X m parity matrix, $s_{ii}$ are the diagonal elements of S, where $S = P^T P$.

NOTE #2: These 2m sectors partition parity space among the m measurements.

(3) Compute the relative volume of parity space represented by each of the m partitions computed in Step (2). Compute m-element vector V as the volume of each partition normalized by the total volume of parity space.

NOTE #1: The norm of V=1.

(4) Using the threshold value T computed in Step (1), compute HPL. Use this value of HPL as the starting value for HPIJ in the Newton-Raphson loop described in Step (5).

(5) Use a Newton-Raphson loop to find the value of HPL such that PFA=3.333e−7. In this loop, $$PFA(HPL) = \sum_{j=1}^{m} v_j P_j$$

$$\frac{dPFA}{dHPL} = \sum_{j=1}^{m} v_j \frac{dP_j}{dHPL}$$

where
$P_j = \text{chi2cdf}(m-4, T_j^2)$ $$\frac{dP_j}{dHPL} = \frac{dP_j}{dT_j}\frac{dT_j}{dHPL} = -2T_j \text{chi2pdf}(m-4, T_j^2)\frac{dT_j}{dHPL}$$

$$= -2T_j \text{chi2pdf}(m-4, T_j^2)/b_j$$

where scalar $b_j = ([1\ 1\ 1\ 0] - n_3^T) \cdot a_j$, and $a_j$ is the jth column of A.

NOTE: The expression for $$\frac{dT_j}{dHPL}$$

derives from the expression for HPL|$H_j$.

(6) Return the values T={$T_j$} from step (5).

Although the present invention has been described with reference to preferred embodiments, workers skilled in the art will recognize that changes may be made in form and detail without departing from the spirit and scope of the invention.

What is claimed is:

1. A global positioning system (GPS) navigation apparatus comprising:
    an antenna adapted to receive GPS satellite signals from each of a plurality of GPS satellites;
    navigation solution determining circuitry coupled to the antenna and receiving the GPS satellite signals, the navigation solution determining circuitry being adapted to determine both a horizontal position of a least squares navigation solution for the apparatus and a horizontal position of a first navigation solution for the apparatus as functions of the received GPS satellite signals, wherein the horizontal position of the first navigation solution for the apparatus is offset from the horizontal position of the least squares navigation solution for the apparatus;
    wherein the horizontal position of the first navigation solution determined by the navigation solution determining circuitry is a maximal integrity horizontal position for the apparatus offset from the horizontal position of the least squares navigation solution for the apparatus; and
    wherein the navigation solution determining circuitry is further adapted to determine a horizontal uncertainty level (HUL) radius $R_{MI}$ for the first navigation solution, wherein the maximal integrity horizontal position of the first navigation solution and the HUL radius $R_{MI}$ for the first navigation solution together define a smallest circle in horizontal space which contains a true horizontal position of the apparatus with a probability of 0.999.

2. The GPS navigation apparatus of claim 1, wherein the navigation solution determining circuitry is adapted to determine the smallest circle in horizontal space which contains a true horizontal position of the apparatus with a probability of 0.999 by determining a radius of a circle which is tangent to three or more CEP circles corresponding to three or more significant satellite measurements.

3. A method of navigating an aircraft using a global positioning system (GPS) receiver, the method comprising:
    receiving GPS satellite signals from a plurality of GPS satellites;
    determining a least squares navigation solution for the GPS aircraft as a function of the received satellite signals;
    determining as a function of the received satellite signals a first correction to the least squares navigation solution, wherein the least squares navigation solution and the first correction to the least squares navigation solution are together indicative of a first navigation solution which is offset by the first correction from the least squares navigation solution;
    navigating the aircraft using the first navigation solution;
    wherein determining as a function of the received satellite signals the first correction to the least squares navigation solution further includes determining as a function of the received satellite signals a maximal integrity correction to the least squares navigation solution, the first navigation solution being a maximal integrity navigation solution; and
    determining as a function of the received satellite signals a horizontal uncertainty limit (HUL) radius $R_{MI}$ for the maximal integrity navigation solution, wherein the maximal integrity navigation solution and the HUL radius $R_{MI}$ together define a smallest circle in horizontal space centered at the maximal integrity navigation solution which contains a true horizontal position of the aircraft with a probability of 0.999.

4. The method of claim 3, wherein determining as a function of the received satellite signals the first correction to the least squares navigation solution further includes determining as a function of the received satellite signals a maximal accuracy correction $x_{MA}$ to the least squares navigation solution, the first navigation solution being a maximal accuracy navigation solution.

5. The method of claim 3, and further comprising computing a set of detection thresholds $T_j$ which equalize values of the 0.999 confidence bound upon a horizontal position error (HPL|$H_j$) in order to minimize the horizontal protection level (HPL).

6. The method of claim 3, and further comprising computing relative magnitudes of partitions of parity space, each of which is defined as that subset of parity space whose constituent points all have a greatest proximity of points in parity space to a characteristic line of a particular measurement.

7. A global navigation satellite system (GNSS) receiver comprising:
- an antenna adapted to receive GNSS satellite signals from each of a plurality of GNSS satellites;
- navigation solution determining means, coupled to the antenna and receiving the GNSS satellite signals from each of the plurality of GNSS satellites, for determining both a horizontal position of a least squares navigation solution for the receiver and a horizontal position of a first navigation solution for the receiver as functions of measurements corresponding to the received GNSS satellite signals, wherein the horizontal position of the first navigation solution for the receiver is offset from the horizontal position of the least squares navigation solution for the receiver; and
- means for computing relative magnitudes of partitions of parity space, each of which is defined as that subset of parity space whose constituent points all have a greatest proximity of points in parity space to a characteristic line of a particular measurement.

8. The GNSS receiver of claim 7, and further comprising means for computing a set of detection thresholds $T_j$ which equalize values of the 0.999 confidence bound upon a horizontal position error (HPL|$H_j$) in order to minimize the horizontal protection level (HPL).

* * * * *